United States Patent [19]

Capilupi, Jr.

[11] Patent Number: 5,775,865
[45] Date of Patent: Jul. 7, 1998

[54] MANUALLY OPERATED, MECHANICALLY ADJUSTABLE, QUICK LIFTER SUPPORT ARM FOR LOADING EQUIPMENT ONTO PICKUP TRUCKS

[76] Inventor: Mario J. Capilupi, Jr., 8103 Crestview Dr., Niagara Falls, N.Y. 14304

[21] Appl. No.: 762,444

[22] Filed: Dec. 9, 1996

[51] Int. Cl.⁶ .................................................. B65G 65/00
[52] U.S. Cl. ........................ 414/498; 280/47.2; 280/655
[58] Field of Search .............................. 414/498; 280/30, 280/767, 641, 651, 652, 655, 47.19, 47.2, 47.27, 47.28, 47.35

[56] References Cited

U.S. PATENT DOCUMENTS

| | | | |
|---|---|---|---|
| 2,565,820 | 8/1951 | Macharic | 414/498 X |
| 2,841,438 | 7/1958 | Weil | 280/641 X |
| 3,669,031 | 6/1972 | Cole | 280/641 X |
| 4,253,546 | 3/1981 | Uchida | 280/30 X |
| 4,284,286 | 8/1981 | Lewallen | 280/47.2 X |
| 4,316,687 | 2/1982 | Lindskog | 414/498 X |
| 5,411,359 | 5/1995 | Kossila | 414/498 |
| 5,431,444 | 7/1995 | Kenealy | 280/767 |
| 5,536,034 | 7/1996 | Miller | 280/655 X |
| 5,547,206 | 8/1996 | Hodges | 280/767 X |
| 5,651,527 | 7/1997 | Clarkson | 414/498 X |

FOREIGN PATENT DOCUMENTS

1486417  6/1989  U.S.S.R. ............... 414/498

*Primary Examiner*—David A. Bucci
*Attorney, Agent, or Firm*—Wallace F. Neyerlin

[57] ABSTRACT

A support arm device is taught for the loading and unloading of equipment on and off a truck bed. The support arm functions like a lever and has wheels at one end and connectors at the other end for coupling to the equipment or to a carrier for the equipment. The support arm is easily mechanically adjustable from vertical to horizontal and vice versa. The wheel end of the support arm is lifted onto a truck tailgate, thus creating a desired axis of balance for the equipment to be loaded. A person acting alone and manually loading the equipment onto the truck bed then only has to apply a less vigorous and less awkward lifting force to the opposite end of the equipment to successfully load it into or onto the truck bed. The invention includes combinations of the support arm with a carrier used with the support arm and also a combination with a support member situated vertically atop the rear end of the carrier.

7 Claims, 9 Drawing Sheets

MANUALLY OPERATED, MECHANICALLY ADJUSTABLE, QUICK LIFTER SUPPORT ARM FOR LOADING EQUIPMENT ONTO PICKUP TRUCKS

BACKGROUND OF THE INVENTION

There are many persons that operate pickup trucks and vans that frequently load and unload hard to handle and or heavy equipment such as lawnmowers, tool boxes, rototillers, etc., in the course of their work. Most commonly the person physically lifts the equipment off the ground, then onto the truck bed, often getting into uncomfortable and awkward and inefficient lifting positions. Other ways of loading and unloading equipment include the use of ramps where the person using a device with wheels, such as a dolly, rolls the dolly with the equipment up the ramp and fully onto the truck bed and reverse for unloading. Heavy equipment can also be loaded mechanically by the use of an elevating platform or a chain hoist system.

1. Field of the Invention

This invention relates to a novel and relatively inexpensive support arm device for assisting in the manual loading and unloading of various equipment, such as lawnmowers and tool boxes, on and off a truck's bed. The device of the invention enables the fast and convenient and efficient manual loading and unloading of such equipment on and off a truck bed by a single person using the novel device.

2. Summary of the Invention

The support arm lifting device of this invention is manually operated and is easily adjustable mechanically from a substantially vertical locked in position to a substantially horizontal locked in position or vice versa for loading equipment onto the beds of conveyances for the equipment. The device comprises a U-shaped tubular metal frame, the sides of the U-shaped frame being referred to as its elongated arms and the transverse portion of the U-shaped frame being referred to as its lifting handle.

The device at its lifting handle end has wheels operatively connected thereto. The ends of the elongated arms distant from the transverse portion of the frame possess connector means for attaching to the equipment to be loaded onto the conveyances for the equipment or for attaching to a carrier for the equipment to be loaded onto the conveyances.

The lifting handle and wheels and elongated arms of the device are of sufficient size and structural strength and rigidity as to withstand forces exerted upon them when the equipment to be lifted and loaded by the user of the support arm lifting device is of substantial size and weight.

In a preferred embodiment, the support arm is used in combination with a carrier on which the equipment is first loaded before the equipment is loaded onto the truck's bed and in which combination the support arm device has connector means which complement and act in conjunction with attachment means on the carrier which facilitate the easy mechanical change in position of the support arm from vertical to horizontal and vice versa as above referred to. The carrier is preferably rectangular in shape and constructed of angle iron with wheels at the corners of the rectangle. The front end of the carrier has means for being attached to the support arm lifting device and the rear end of the carrier has a tubular handle connected to same to assist the user of the combination to lift the carrier and the equipment loaded on said carrier and to push the combination onto the bed of the conveyance means for the equipment or to pull the combination from its conveyance means in order to unload the equipment.

In another preferred embodiment the rear end of the carrier is so designed that the tubular handle at said end cannot only serve to assist the user of the combination in lifting the carrier and the equipment loaded onto same but also can function to help provide a structural base for a rectangular support member which the user of the combination can situate vertically atop the tubular handle of the carrier. This can be useful in helping to provide a workbench like arrangement as hereafter described, such as in cases where the person using the combination might be a carpenter. Such a rectangular support member will preferably be fabricated from flat iron sides and a flat iron top and a flat iron cross-member near the bottom of the support member. The bottoms of the flat iron sides have cut-out recesses in said sides so as to lock over the tubular handle at the rear end of the carrier, and the ends of the flat iron top are bent to vertical so as to restrict horizontal movement of any planking or plywood which might be used or placed upon the top of the support member. The rectangular support member will also preferably possess diagonal cross-bracing members connected to the interior corners of the rectangular support member to provide desirable structural strength.

When loading the equipment onto a pickup truck, the support arm is attached to the equipment or its carrier and adjusted to the loading position. The end of the support arm with the wheels is then manually lifted and placed onto the truck's tailgate, transferring part of the weight of the equipment from the ground to the truck. The person using the device then gets positioned at the opposite end of the equipment or carrier, i.e. the end of the equipment or carrier opposite from the end to which the support arm has been connected or mounted, and then manually lifts the equipment or the carrier with the equipment on it (i.e. the "work load") vertically off the ground. This is done very easily and efficiently and does not require any awkward or uncomfortable positioning. Also less foot-pounds of energy are required since the work load is now being held off the ground by the user holding one end of the work load and the other end of the work load is being supported in a raised position by the truck tailgate by means of the end of the support arm with the wheels. The person's end of the work load is then raised high enough to where the bottom of the work load is at the same or higher than the elevation of the truck bed. The person then physically pushes the work load forward until it is fully into or onto the truck bed. The support arm wheels allow easy movement onto the truck bed. The invention thus overcomes the typical problem of the awkward positioning of a person's body when reaching down to pick up a cumbersome piece of heavy equipment at opposite ends and lifting it into the truck bed. The equipment is then taken to the site where it is to be used. The support arm is then used again in assisting the unloading of the equipment from the truck.

BRIEF DESCRIPTION OF THE DRAWINGS

In the schematic side elevational view of FIG. 4, the user of the device now merely pushes (see arrow) against the rear end of the equipment in order to load it onto the bed 52 of the pickup truck 60, the support arm 1 and the linkages 2 and 3 all being of substantial size and strength sufficient to withstand the physical stresses involved, tire 61 being a rear tire of the pickup truck 60.

Support arm 1 will preferably be angled at a short distance from the wheel 20 end of the arm, such as illustrated in FIGS. 2, 3 and 4, at an angle of about 30° to about 50° (from vertical). This helps facilitate the easier loading of heavy equipment onto the tailgate (such as tool box equipment 50 which might contain a large quantity of heavy tools).

However, this support arm need not have an angular bend in same, and this is illustrated in the schematic side views shown in FIGS. 5, 6 and 7 which illustrate the utilization of the device in loading relatively light equipment (e.g. a power lawnmower) 50a into a pickup truck.

DETAILED DESCRIPTION OF THE DRAWINGS OF THE PREFERRED EMBODIMENTS

Figure 1:
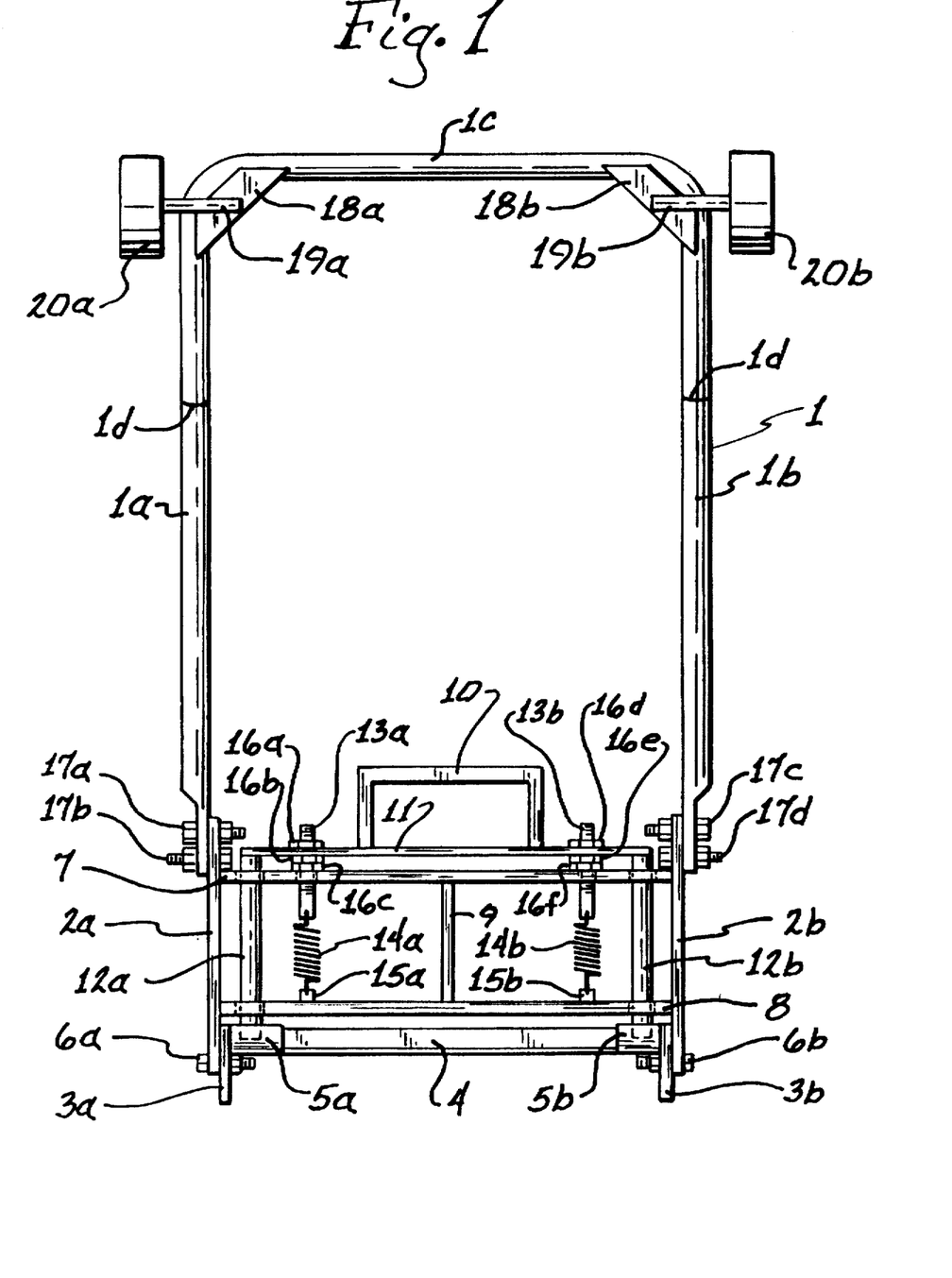
FIG. 1 is a vertical sectional view of the manually operated, mechanically adjustable, quick lifter support arm device including flat stock extensions therefor for loading equipment onto the beds of pickup trucks or other surfaces or conveyances for the equipment to be loaded thereon.

In FIG. 1, numeral 1 depicts the inverted U-shaped steel tubular stock in general, which comprises a handle of the lifting device. Numeral 1a depicts the left side of the handle, numeral 1b the right side, numeral 1c the top end of the handle and numeral 1d depicts an angular bend in each side of the handle. Numeral 2 depicts steel flat-stock extensions in general for the handle, 2a an extension on the left side and 2b an extension on the right side. Numeral 3 depicts mounting means in general onto the equipment 50 or 50a to be loaded, or onto the carriers 27 for the equipment to be loaded, 3a depicting mounting means on the left side and 3b depicting mounting means on the right side. In later figures, numeral 3 depicts mounting means on a cart for a tool box, or mounting means on the handle bars of a power lawnmower. Numeral 4 depicts an angle iron brace support and is a part of the means used for connecting extensions 2a and 2b to mounts 3a and 3b on the carrier 27 for the equipment to be loaded. Numerals 5a and 5b depict curved surface welds on brace support 4 for easing angular adjustment of the support arm handle I from vertical to horizontal and vice versa. Numerals 6a and 6b are strong pivot pins or bolts for use in the changing of the pivotal angular adjustment of the support arm handle. Numerals 7, 8, and 9 are structural flat iron members to provide strength for other members of the device when changing its angular adjustments, numeral 9 being a brace between members 7 and 8. Numeral 10 depicts a gripping handle used by the operator of the device in changing position of the main handle of the device from vertical to horizontal and vice versa. Numerals 12a and 2b, depict locking rods welded to the underside of crossmember 11. These rods smoothly ride over curved surface members 5a and 5b welded onto brace support 4 in changing position of the support arm handle from vertical to horizontal and vice versa. When the support arm handle is vertical, the rods lock past the tops of the curved surface members 5a and 5b; by means of the springs 14a and 14b; and when the support arm handle is horizontal, the rods lock under the bottoms of the curved surfaces, by means of the springs 14a and 14b. Bolt 13a and nuts 16a, b and c are used for adjusting tension on spring 14a; and bolt 3b and nuts 16d, e and f are for adjusting tension on spring 14b. Nuts 16c and 16f prevent the entire handle piece (10, 11, 12a and 12b) from going down too far in which case the spring tension would be lost. These various nuts and bolts are also used in order to limit the amount of linear movement of the gripping handle 10. Springs 14a and 14b enable the locking rods 12a and 12b to lock into their locked-in positions on their own when changing the tubular support arm handle 1 from vertical to horizontal and vice-versa, thus eliminating the necessity of the user having to do this manually. Springs 14a and 14b are connected to cross-member 8 by appropriate attachment means 15a and 15b respectively.

The lower ends of sides 1a and 1b of the tubular handle are preferably flattened by the maker of the device to facilitate their easy and efficient strong attachment to the top ends of the flat sheet stock extensions 2a and 2b by means of nuts and bolts 17a and 17b on the left side of the handle and nuts and bolts 17c and 17d on the right side of the handle as illustrated in FIG. 1.

The top end 1c of the handle 1 of the device has flat sheet steel members 18a and 18b welded to the undersides of the tubing to provide strong surface means for welding axles 19a and 19b of wheels 20a and 20b thereto. Wheels 20a and 20b are important members of the device of this invention since they facilitate the easy sliding in and out of the equipment being loaded and unloaded into or from the pickup truck by the user of the device.

Figure 2:
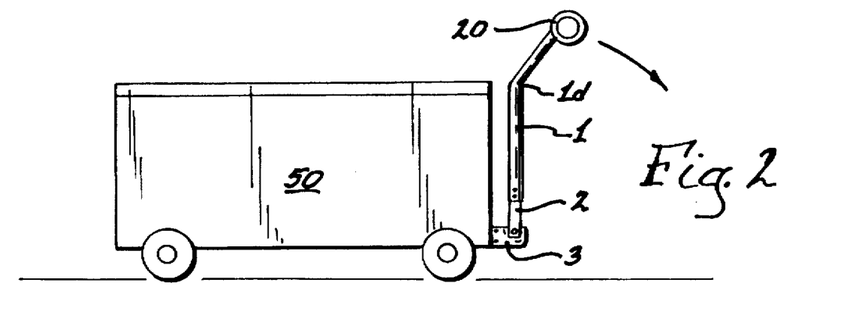
FIG. 2 is a schematic side elevational view of equipment 50 to be loaded with the quick lifter support arm device attached thereto; a portion of the arm 1 of the device being in a substantially vertical position.
Figure 3:
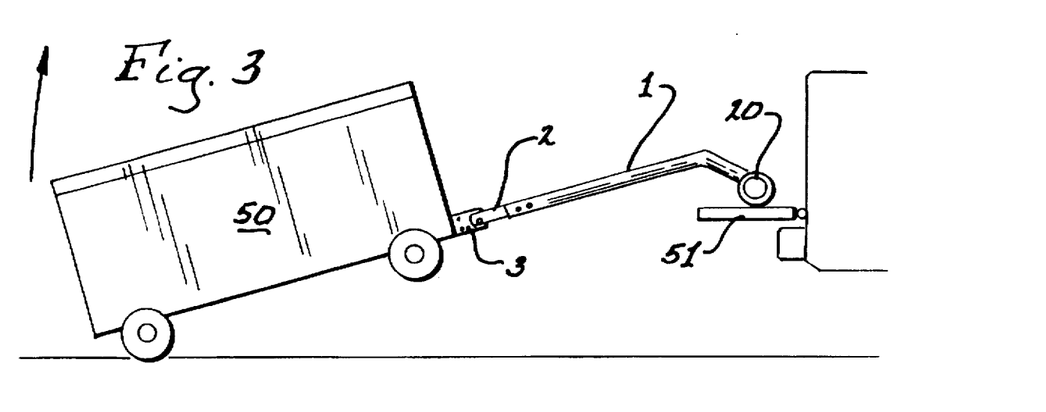
FIG. 3 is also a schematic side elevational view of equipment 50 to be loaded with the quick lifter support arm device attached thereto; but with a portion of the arm 1 of the device having been changed from the substantially vertical position to a more horizontal position; this change having been effected manually by the user of the device by altering the mechanical connection arrangement between members 2 of the support arm device and connection means 3 on the equipment to be loaded. Also in this view the user of the device has manually lifted the wheel end 20 of the support arm device on to the tail gate 51 of a pickup truck onto which the equipment is to be loaded. After the user of the device has done this, he than proceeds to go to the distant end of the equipment 50 to be loaded to physically lift (please see arrow) the entire equipment to a substantially horizontal position as illustrated in FIG. 4.

In FIG. 2, the support arm handle extension means is designated as numeral 2 and the equipment connection means is designated as numeral 3. The support arm device has been connected to the equipment 50 to be loaded; (or to a carrier for the equipment) and the arrow indicates the intention of the user to change position of handle 1 from vertical to horizontal, as shown in FIG. 3.

What is illustrated in FIGS. 4, 5, 6 and 7 has previously been described in the earlier descriptions of these Figures.

Figure 8:
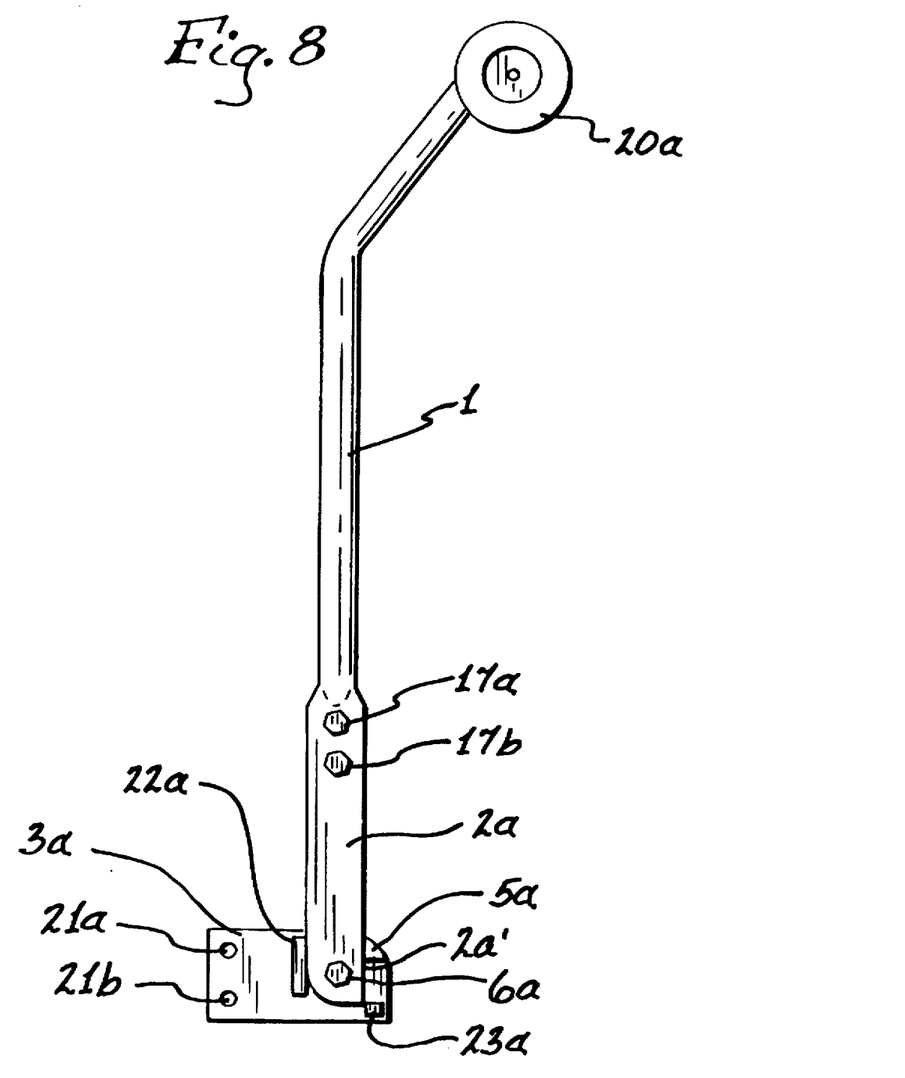
FIG. 8 is a left side sectional view of the device shown in FIG. 1, but showing some structural elements at the bottom of this Figure not shown in FIG. 1 and which structural elements are hereinafter later described.

FIG. 8 is set forth to illustrate structure and the mechanics involved in changing positions of the support arm 1 from vertical to horizontal and vice versa. When the user of the device pulls up on gripping handle 10 (of FIG. 1), the bottom of locking rod 12a rises above the top surface of the mounting means 3a on the equipment being moved, and frees arm 2a from its locked-in position behind welded stop 22a, and enables the user of the device to lower arm 1 from vertical to horizontal. In doing this, the flat surface 2a' at the bottom of extension arm 2a rotates from the vertical position shown to a horizontal position in which surface 2a' locks against the top surface of welded stop 23a, assuring rigid positioning of the support arm device in either the vertical condition as illustrated in FIG. 8 and also in its horizontal condition and vice versa. The right end portion of FIG. 9 is also of help in illustrating and explaining the mechanics involved in altering the positioning of the support arm by the user of the device, wherein extension arm 2b would be freed from its locked in position against welded stop 22b and would be rotated to a horizontal position atop welded stop 23b.

Figure 9:
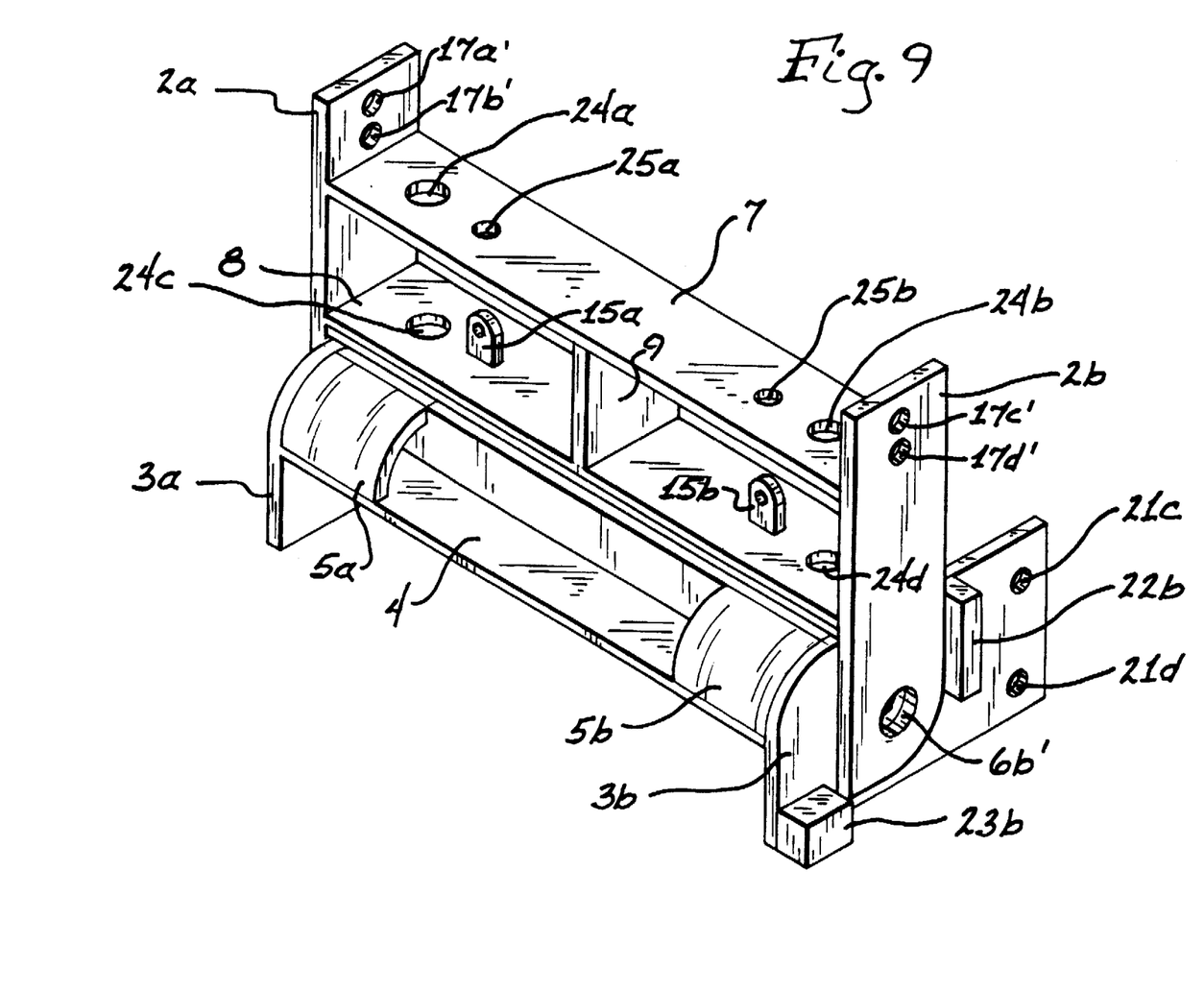
FIG. 9 is a front and right side perspective view of the lower portion of the device of FIG. 1 which is set forth to illustrate the connecting means of the device to the equipment to be lifted and the structural arrangement involved which enables the user of the device to easily change the positioning of the support arm from a substantially vertical position to a substantially horizontal position, and vice versa, during the operation of loading and unloading the equipment onto and off of the pickup truck being used.

FIG. 9 shows additional features of the bottom portion of the support arm extensions and its cross-members and the coupling arrangement with the connection means on the equipment to be loaded and unloaded or with the connection means on the carrier for the equipment. Holes 24a and 24c are for rod 12a; holes 24b and 24d are for rod 12b; hole 6b' is for bolt 6b; holes 21c and 21d are holes for bolts for connecting to the coupling means on the equipment to be transported; holes 17a' and 17b' are for bolts 17a and 17b; holes 17c' and 17d' are for bolts 17c and 17d; and holes 25a and 25b are for bolts 13a and 13b. Holes 24 are typically 17/32" in diameter and rods 12 are typically ½' in diameter.

Referring also to FIG. 1 as well as to FIG. 9, it should be noted that bolts 17 are fastened differently, the threaded ends of bolts 17a and 17c facing to the inside of the device and the threaded ends of bolts 17b and 17d facing to the outside. Bolts 17a and 17c extend inward and toward each other far enough that they are used as a stop for gripping handle 10, crossmember 11 and locking rods 12a and 12b, preventing gripping handle 10 and components 11, 12a and 12b from being lifted too far out of place, i.e. particularly too far out of holes 24c and 24d of crossmember 8, but also out of holes 24a and 24b of crossmember 7. This assures keeping gripping handle 10 and its components 11, 12a and 12b properly in place in structural members 7, 8 and 9 that are connected to extension arms 2a and 2b.

In production the various units of FIG. 9 are typically welded and drilled and assembled as one piece before being bolted together with other members of the completed device of the invention, it being noted that other alternative arrangements are considered within the scope of the invention, depending, for example on the structural features of the equipment to be loaded and unloaded (e.g. handles of a power lawnmower).

Figure 10:
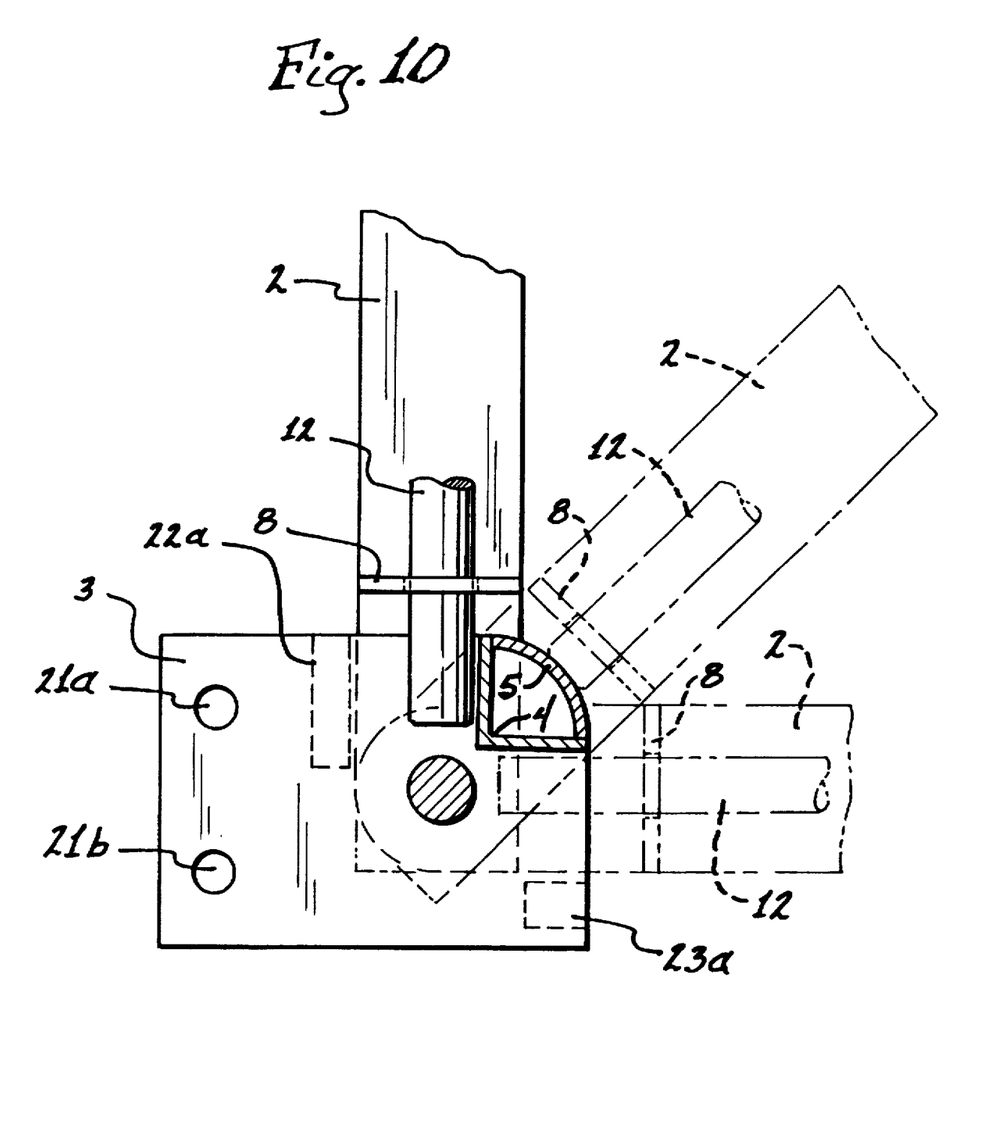
FIG. 10 is another partial sectional view of the left side of the lower portion of the device of FIG. 1, set forth to illustrate the mechanical means used to facilitate the alternate positions of pin 12 as the user changes the support arm from vertical to horizontal (and vice versa) when the user of the device loads and unloads the equipment with which the support arm is used.

FIG. 10 further illustrates the mechanics involved or at play in shifting the position of extension arm 2 from vertical to horizontal. When gripping handle 10 is pulled up by the user of the device, rod 12 is manually changed from its illustrated vertical position to a position atop curved surface 5, or at an angle of about 45 degrees as illustrated. As arm 2 is then lowered to horizontal, rod 12 then becomes horizontal and locked in position under cross arm 4. The relative position of rod 12 to cross bar member 8 during this transition is as illustrated in this Figure.

Figure 11:
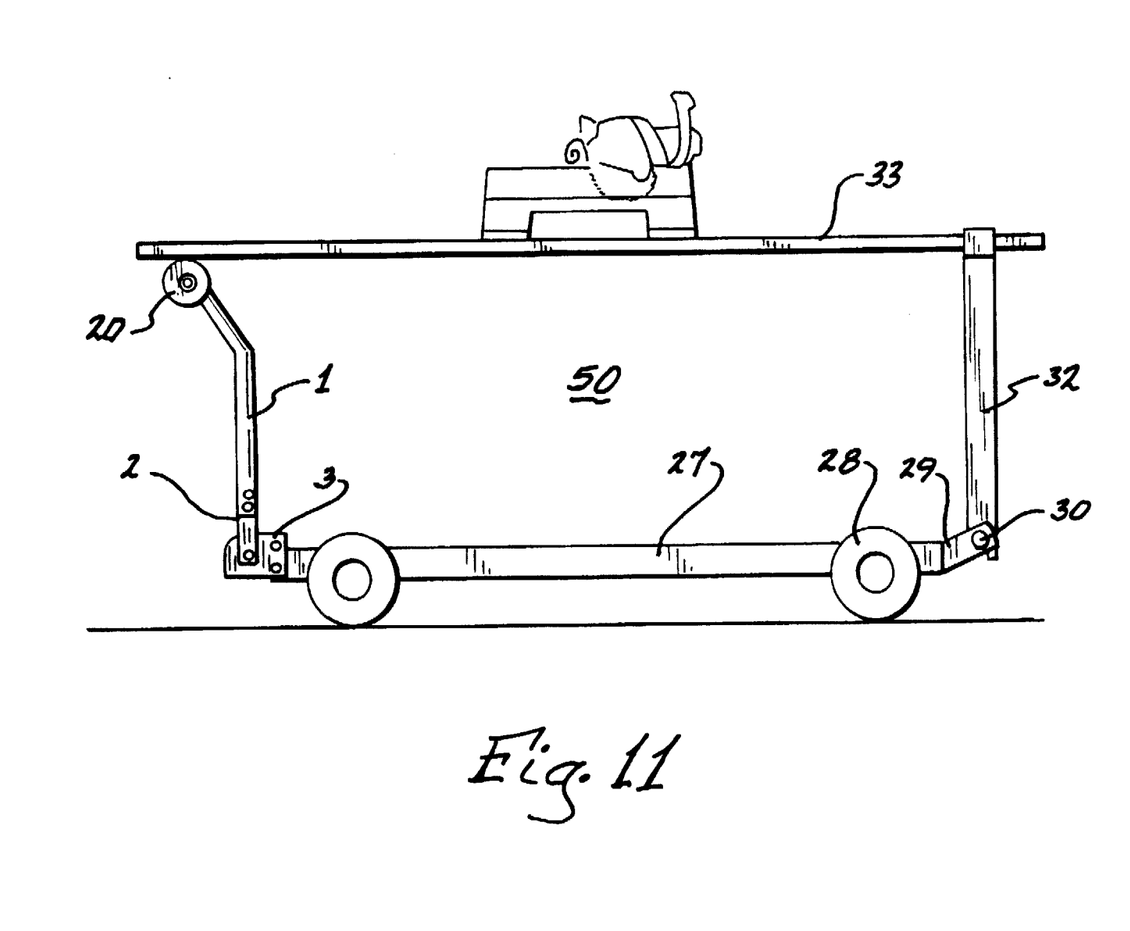
FIG. 11 is a cross-sectional schematic view of the support arm device and a carrier 27 of unique design to which it is connected, illustrating also other elements of utility which are described in more detail hereinafter.

FIG. 11 illustrates other additional features of this invention in combination with what has previously been described. In this Figure, item 50 is the equipment to be loaded and transported, such as a heavy tool box loaded with tools. Numeral 27 represents a carrier for the equipment. The carrier typically is a rectangular base formed about its perimeter with welded angle iron on each side and end, and on which and over the interior bottom of which a plywood base has been placed to support the loaded tool box. The equipment has been transported to the location where the tools are to be used and the user of the device has attached a rectangular support 32 over a support bar 30 at the end of the carrier distant from the quick lifter support arm 1 at the other end of the carrier. The user then places (plywood) planking 33 atop the carrier, supported at one end by surface 1c of the support arm and by the top of 32 at the other end to serve as a work bench for tools such as a power saw as illustrated schematically. Carrier 27 has four wheels 28, to facilitate the loading and unloading operations, and structural features 29 and 30, the details and functions of which are described more fully in connection with the descriptions of FIGS. 13 and 14.

Figure 12:
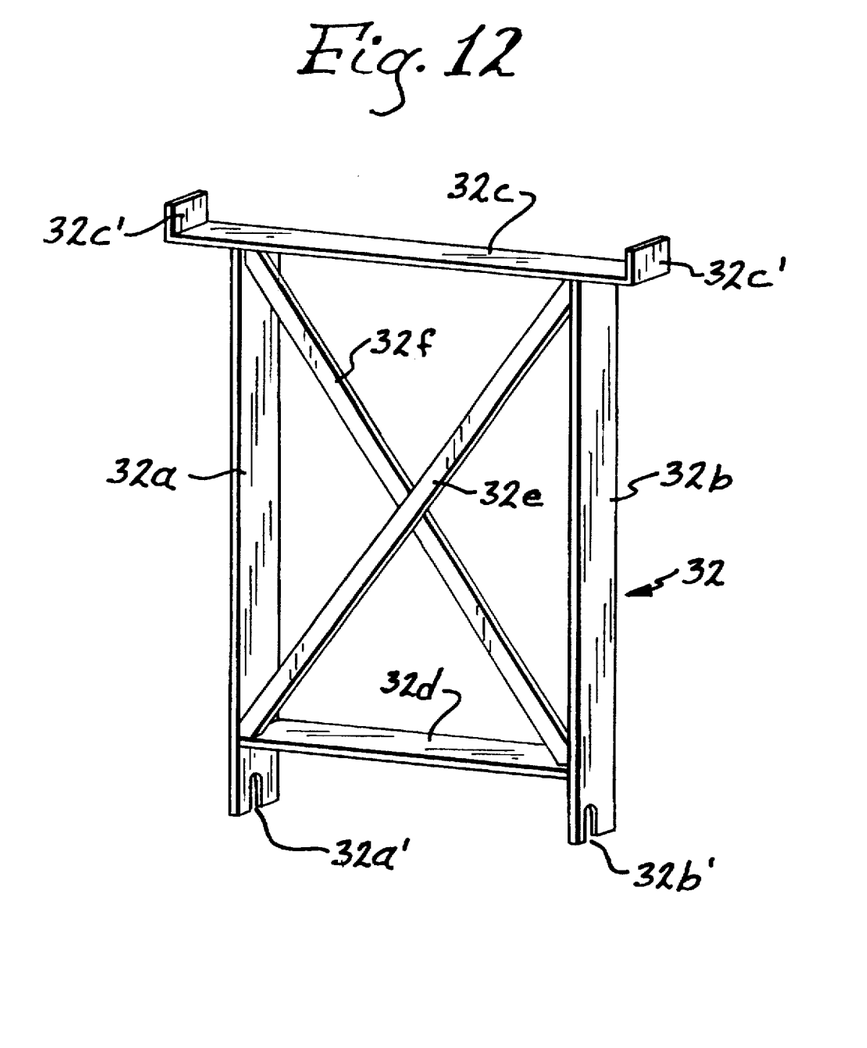
FIG. 12 is a vertical sectional view of a structural element 32 which may be used in connection with the carrier 27 of FIG. 11, the utility of this element and other elements of FIG. 11 being described in more detail hereinafter.

Rectangular support member 32 of FIG. 12 will typically be fabricated from flat iron sides 32a and 32b and top 32c and bottom 32d and with cross-bracing members 32f and 32e to provide desirable structural strength. The ends of top 32c will preferably be bent to vertical positions 32c' so as to restrict horizontal movement of the planking or plywood used or placed on the top of 32c. The bottoms of sides 32a and 32b will have cut-out recesses 32a' and 32b' in said sides so as to lock over the cylindrical support bar 30 as shown in FIGS. 11 and 13.

Figure 4:
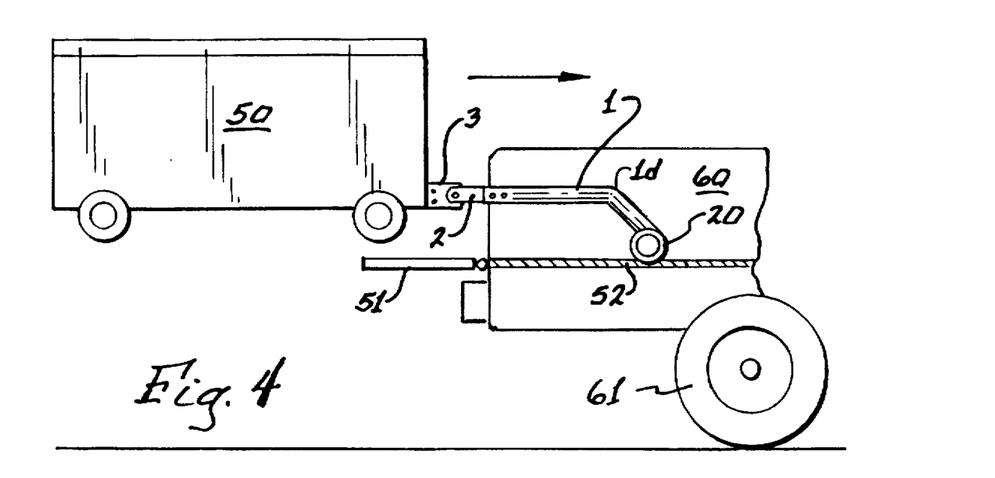
Figure 5:
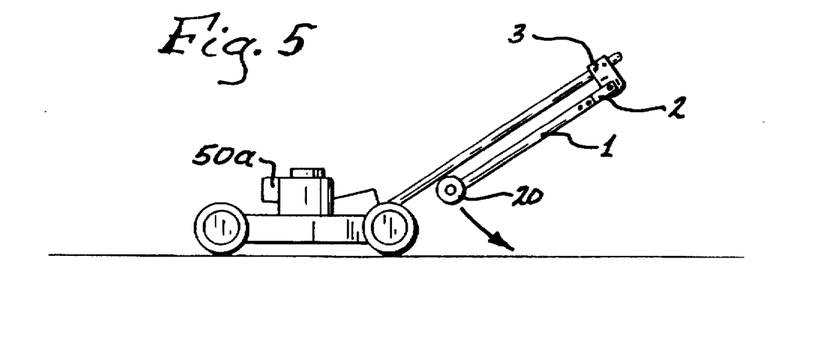
Figure 6:
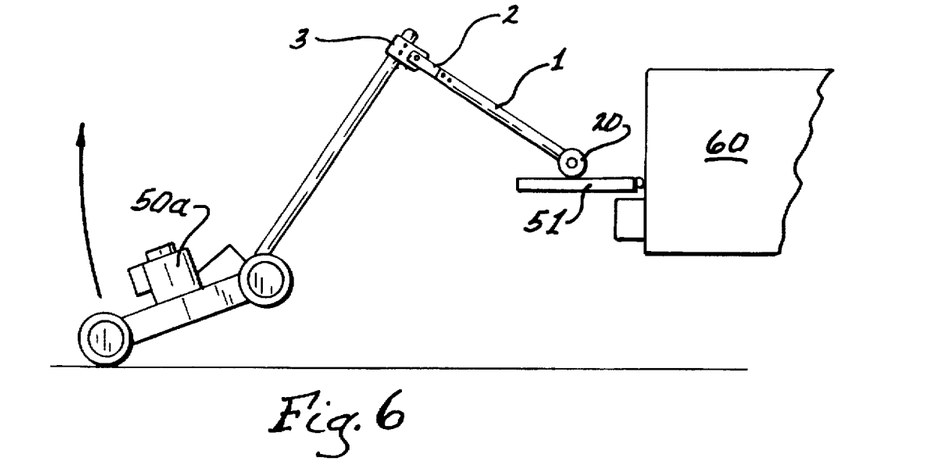
Figure 7:
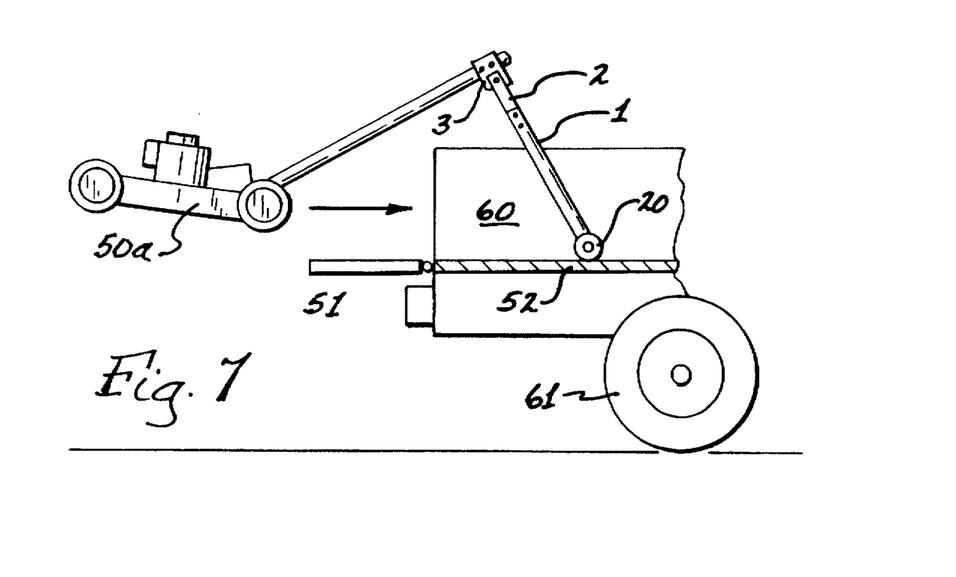
Figure 13:
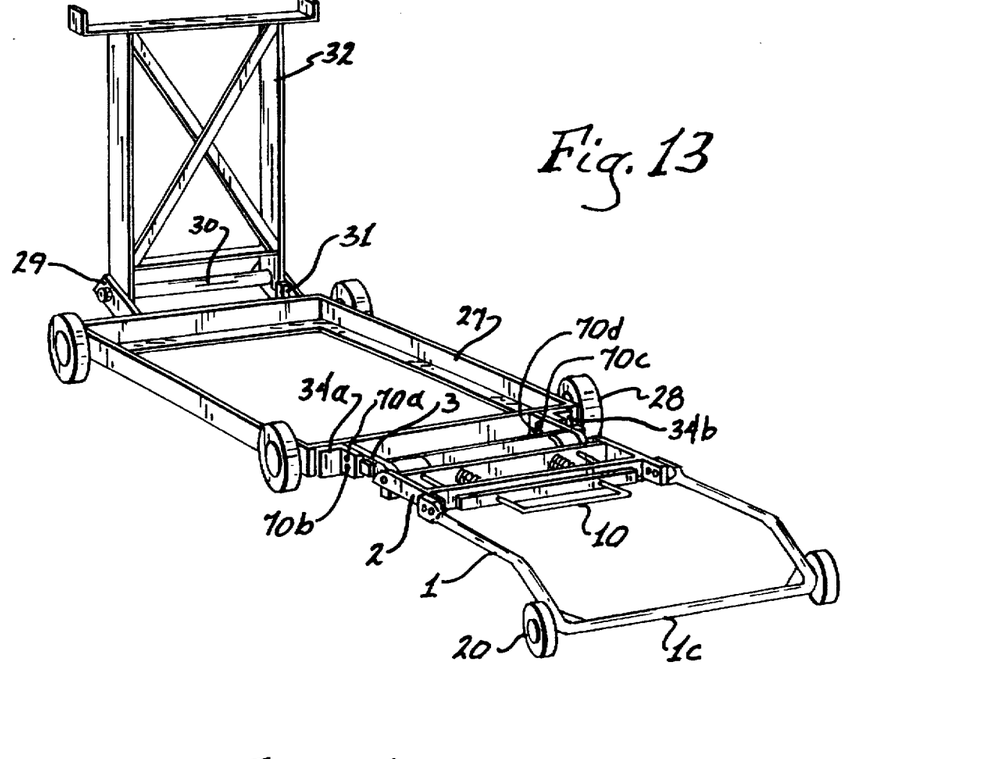
FIG. 13 is a perspective schematic view illustrating all of the structural elements of the devices of this invention used either singly or in combination with each other; support arms 1 of the device being in a substantially horizontal position as compared to the substantially vertical position of the arrangement as illustrated in FIG. 11.

FIG. 13 illustrates an overall perspective view of the support arm device 1 as attached to the carrier 27 and with the rectangular support member 32 set in place atop and at the rear of carrier 27. Mounting means 3 is bolted to the carrier at flanges 34a and b. Flanges 34a and 34b are welded to the front of carrier 27 and the holes 70a and 70b align with the holes 21a and 21b on mounting means 3a and the holes 70c and 70d align with the holes 21c and 21d on mounting means 3b (please see FIG. 9). The user of the device will typically place plywood or other load bearing members to line the bottom of the carrier and then will place the equipment to be loaded into and atop the load bearing surface. The equipment to be loaded may be a tool chest loaded with tools, or a heavy generator or a power mower etc. (If the "equipment" is something oversized to fit entirely on the carrier the support member 32 may first be removed from the carrier so as not to be in the way of the loading operation). After the equipment is loaded onto the carrier, (which operation generally will not require the user to lift the entire weight of the equipment onto the carrier at once), the user of the device then lifts end 1c onto the tailgate of the pickup truck, as shown in FIG. 3, and then goes to the rear end of the carrier and lifts the carrier with the equipment thereon by means of pulling up on support bar 30 whose main use is as a lifting handle. The user then pushes all of the foregoing into the pickup truck, as illustrated in FIG. 4.

After the user of the device has gotten the equipment to its destination and unloaded it from the pickup truck, the user may then wish to use the device and carrier for a purpose such as previously described by reference to FIG. 11, in which case support member 32 will be set in place atop support bar 30.

Figure 14:
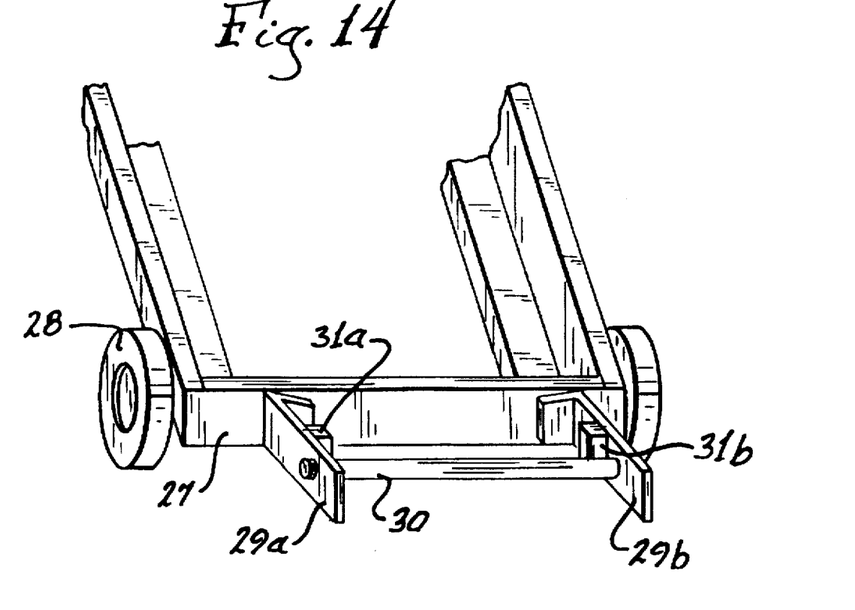
FIG. 14 is a perspective schematic view illustrating the rear portion of carrier 27 and the structural arrangement of said rear portion for rigidly connecting structural element 32 to the end of same.

FIG. 14 illustrates structural details at the rear end of the carrier. Flanges 29a and 29b are welded to the rear end of carrier 27 and tubing support lifting bar is welded to interior holes in said flanges. Rectangular metal welds 31a and 31b assure a relatively snug fit of the rectangular support member 32 between the lifting bar 30 and the rectangular welds so as to provide a fairly rigid arrangement of all the combination of parts when the devices described and claimed are employed for purposes as described in connection with FIG. 11.

Having described this invention, it should be apparent that numerous structural modifications and adaptions may be resorted to without departing from the scope and fair meaning of the invention.

I claim:

1. A support arm lifting device for loading equipment onto beds of conveyances for the equipment, said device comprising a U-shaped tubular metal frame with sides and a transverse portion, the sides of the U-shaped frame being referred to as its elongated arms with ends and the transverse portion of the U-shaped frame being referred to as its lifting handle, wherein the lifting handle is referred to as one end of the device and has wheels operatively connected thereto, wherein the ends of the elongated arms distant from the transverse portion of the frame are jointly referred to as the end of the device opposite from the lifting handle end, and wherein said ends of the elongated arms distant from the transverse portion of the frame possess connector means for attaching to the equipment to be loaded onto the conveyances for the equipment or for attaching to a carrier for the equipment to be loaded onto the conveyances, wherein said lifting device is manually operated and adjustable mechanically at its end opposite from the lifting handle end from a substantially vertical position to a substantially horizontal position or vice versa, wherein the lifting handle and wheels and the elongated arms of the device are of sufficient size and structural strength and rigidity as to withstand forces exerted upon them when the equipment to be lifted and loaded by the user of the support arm lifting device is of substantial size and weight, and wherein the connector means at the ends of the elongated arms of the support arm lifting device comprise flat iron extensions with bottom ends and inside and outside surfaces doubly bolted as upper and lower sets of bolts to each of the ends of the elongated arms distant from the transverse portion of the frame, two transverse structural members welded to the inside surfaces of the flat iron extensions, one of the transverse structural members being welded just slightly below the lower set of bolts on the flat iron extensions and the other transverse structural member being welded near the bottom ends of the flat iron extensions, said transverse structural members also being mechanically reinforced by a vertical flat iron piece welded to the transverse members near their mid-points, each of the transverse structural members having a set of holes near each of their ends for surrounding cylindrical metal pegs which are moveable vertically within the holes, said pegs being welded to a third cross-member at its underside, and said third cross-member being moveable vertically by the user of the support arm lifting device in the operation of mechanically adjusting the support arm from a substantially vertical position to a substantially horizontal position or vice versa.

2. In combination: A a support arm lifting device for loading equipment onto beds of conveyance means for the equipment, said device comprising a U-shaped tubular metal frame with sides and a transverse portion, the sides of the U-shaped frame being referred to as its elongated arms with ends and the transverse portion of the U-shaped frame being referred to as its lifting handle, wherein the lifting handle is referred to as one end of the device and has wheels operatively connected thereto, wherein the ends of the elongated arms distant from the transverse portion of the frame are jointly referred to as the end of the device opposite from the lifting handle ends, and wherein said ends of the elongated arms distant from the transverse portion of the frame possess connector means for attaching to the equipment to be loaded onto the conveyance means for the equipment or for attaching to a carrier for the equipment to be loaded onto the conveyance means, wherein said lifting device is manually operated and adjustable mechanically at its end opposite from the lifting handle end from a substantially vertical position to a substantially horizontal position or vice versa and wherein the lifting handle and wheels and the elongated arms of the device are of sufficient size and structural strength and rigidity as to withstand forces exerted upon them when the equipment to be lifted and loaded by the user of the support arm lifting device is of substantial size and weight; and B. a carrier for the equipment, said carrier being rectangular with four corners and a front end and a rear end and constructed of angle iron, with wheels at the corners of the rectangle, the front end of the carrier having means for being attached to the support arm lifting device and the rear end of the carrier having a tubular handle connected to same to assist the user of the combination to lift the carrier and the equipment loaded on said carrier and to push the combination onto the bed of the conveyance means for the equipment or to pull the combination from its conveyance means in order to unload the equipment.

3. The combination of claim 2 wherein the connector means at the ends of the elongated arms of the support arm lifting device and the attachment means at the front end of the carrier complement each other and enable easy mechanical adjustment of the position of the support arm lifting device from a locked in position substantially vertical to the carrier to a locked in position in substantially horizontal alignment with the carrier.

4. The combination of claim 3 wherein the connector means at the ends of the elongated arms of the support arm lifting device comprise flat iron extensions with bottom ends and inside and outside surfaces doubly bolted as upper and lower sets of bolts to each of the ends of the elongated arms distant from the transverse portion of the frame, two transverse structural members welded to the inside surfaces of the flat iron extensions, one of the transverse structural members being welded just slightly below the lower set of bolts on the flat iron extensions and the other transverse structural member being welded near the bottom ends of the flat iron extensions, said transverse structural members also being mechanically reinforced by a vertical flat iron piece welded to the transverse members near their mid-points, each of the transverse structural members having a set of holes near each of their ends for surrounding cylindrical metal pegs which are moveable vertically within the holes, said pegs being welded to a third cross-member at its underside, and said third cross-member being moveable vertically by the user of the support arm device in the operation of mechanically adjusting the support arm from a substantially vertical position to a substantially horizontal position or vice versa.

5. The combination of claim 3 wherein the attachment means on the carrier comprises a pair of mounting means with inner and outer surfaces attached at each end of the front of the carrier, said mounting means being mechanically linked by horizontal angle iron brace support, with curved upper surfaces at each end for easing angular adjustment of the support arm handle from vertical to horizontal and vice versa by means of locking rods riding over the curved surfaces and wherein the outer surfaces of the mounting means possess vertical metal stops welded to same for limiting the degree of support arm movement when the user of the device adjusts the support arm from horizontal to vertical.

6. In combination: A. a support arm lifting device for loading equipment onto beds of conveyance means for the equipment, said device comprising a U-shaped tubular metal frame with sides and a transverse portion, the sides of the U-shaped frame being referred to as its elongated arms with ends and the transverse portion of the U-shaped frame being referred to as its lifting handle, wherein the lifting handle is referred to as one end of the device and has wheels operatively connected thereto, wherein the ends of the elongated arms distant from the transverse portion of the frame are jointly referred to as the end of the device opposite from the lifting handle end, and wherein said ends of the elongated arms distant from the transverse portion of the frame possess connector means for attaching to the equipment to be loaded onto the conveyance means for the equipment or for attaching to a carrier for the equipment to be loaded onto the conveyance means, wherein said lifting device is manually operated and adjustable mechanically at its end opposite from the lifting handle end from a substantially vertical position to a substantially horizontal position or vice versa and wherein the lifting handle and wheels and the elongated arms of the device are of sufficient size and structural strength and rigidity as to withstand forces exerted upon them when the equipment to be lifted and loaded by the user of the support arm lifting device is of substantial size and weight; and B. a carrier for the equipment, said carrier being rectangular with four corners and a front end and a rear end and constructed of angle iron, with wheels at the corners of the rectangle, the front end of the carrier having means for being attached to the support arm lifting device and the rear end of the carrier having a tubular handle connected to same to assist the user of the combination to lift the carrier and the equipment loaded on said carrier and to push the combination onto the bed of the conveyance means for the equipment or to pull the combination from its conveyance means in order to unload the equipment; and C. a rectangular support member situated vertically atop the tubular handle at the rear end of the carrier, said support member being fabricated from flat iron sides and a flat iron top and a flat iron cross-member near a base of the support member, wherein bottom ends of the flat iron sides have cut-out recesses in said sides so as to lock over the tubular handle at the rear end of the carrier, and wherein the ends of the flat iron top are bent to vertical so as to restrict horizontal movement of any planking or plywood which might be used or placed upon the top of the support member.

7. The combination of claim 6 wherein the rectangular support member possesses diagonal cross-bracing members connected to interior corners at a top and near the bottom of the rectangular support member to provide desirable structural strength.

* * * * *